(12) United States Patent
Piepenbrink et al.

(10) Patent No.: US 10,412,133 B2
(45) Date of Patent: Sep. 10, 2019

(54) PUBLIC/PRIVATE COMMUNICATIONS PATHS

(71) Applicant: AT&T Intellectual Property I, L.P., Atlanta, GA (US)

(72) Inventors: David J. Piepenbrink, Denver, CO (US); Lee M. Chow, Naperville, IL (US); James T. Sofos, Aurora, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 6 days.

(21) Appl. No.: 15/136,884

(22) Filed: Apr. 23, 2016

(65) Prior Publication Data

US 2016/0241618 A1 Aug. 18, 2016

Related U.S. Application Data

(63) Continuation of application No. 12/618,207, filed on Nov. 13, 2009, now Pat. No. 9,325,502.

(51) Int. Cl.
| | |
|---|---|
| H04L 29/06 | (2006.01) |
| H04L 9/32 | (2006.01) |
| H04L 29/08 | (2006.01) |
| H04W 84/04 | (2009.01) |

(52) U.S. Cl.
CPC ........ *H04L 65/4084* (2013.01); *H04L 9/3226* (2013.01); *H04L 9/3263* (2013.01); *H04L 65/60* (2013.01); *H04L 67/10* (2013.01); *H04W 84/042* (2013.01); *H04L 2209/56* (2013.01); *H04L 2209/60* (2013.01)

(58) Field of Classification Search
CPC . H04L 65/4084; H04L 9/3226; H04L 9/3263; H04L 65/60; H04L 67/10; H04L 84/042; H04L 2209/56; H04L 2209/60; H04W 84/042
USPC .............................. 726/4; 709/227, 230, 238
See application file for complete search history.

(56) References Cited

U.S. PATENT DOCUMENTS

| | | |
|---|---|---|
| 6,961,858 B2 | 11/2005 | Fransdonk |
| 7,107,462 B2 | 9/2006 | Fransdonk |
| 7,130,820 B2 | 10/2006 | Song |
| 7,213,047 B2 | 5/2007 | Yeager et al. |
| 7,231,660 B1 | 6/2007 | Daude et al. |
| 7,237,255 B2 | 6/2007 | Fransdonk |
| 7,404,084 B2 | 7/2008 | Fransdonk |
| 7,415,721 B2 | 8/2008 | Fransdonk |
| 7,509,496 B2 | 3/2009 | Skog et al. |
| 7,549,051 B2 | 6/2009 | Dillaway et al. |
| 7,565,546 B2 | 7/2009 | Candelore |
| 7,568,114 B1 | 7/2009 | Schlafly |
| 7,614,083 B2 | 11/2009 | Khuti et al. |
| 7,627,501 B2 | 12/2009 | Bagsby et al. |
| 7,631,325 B2 | 12/2009 | Rys et al. |
| 7,747,706 B2 | 6/2010 | Ran |
| 7,793,337 B2 | 9/2010 | Casey et al. |
| 7,822,973 B2 | 10/2010 | Okaya |

(Continued)

*Primary Examiner* — Eric W Shepperd
*Assistant Examiner* — Feliciano S Mejia
(74) *Attorney, Agent, or Firm* — Scott P. Zimmerman, PLLC

(57) ABSTRACT

Access to transactional multimedia content may be based on network routing. Some multimedia content may be best delivered via a private network. Other multimedia content may be best delivered via a public network. A type of the multimedia content may thus determine network routing.

20 Claims, 5 Drawing Sheets

(56) References Cited

U.S. PATENT DOCUMENTS

| | | | |
|---|---|---|---|
| 7,873,578 B2 | 1/2011 | Johnson et al. | |
| 7,886,351 B2* | 2/2011 | Dadhia | H04L 63/02 |
| | | | 726/11 |
| 7,907,615 B2* | 3/2011 | Abbasi | H04L 29/06027 |
| | | | 370/395.21 |
| 7,917,942 B2 | 3/2011 | Costa-Requena et al. | |
| 8,069,265 B2* | 11/2011 | Palm | H04L 12/2803 |
| | | | 370/229 |
| 8,413,229 B2* | 4/2013 | Mullick | H04L 63/0272 |
| | | | 713/183 |
| 8,458,753 B2* | 6/2013 | Hasek | H04N 7/17309 |
| | | | 725/86 |
| 8,661,147 B2* | 2/2014 | Sheleheda | G06F 16/907 |
| | | | 709/229 |
| 8,825,887 B2* | 9/2014 | Jennings | H04N 7/165 |
| | | | 709/231 |
| 8,898,722 B2* | 11/2014 | Reisman | G06F 17/30873 |
| | | | 725/110 |
| 9,055,085 B2* | 6/2015 | Mao | H04N 21/222 |
| 9,380,101 B2* | 6/2016 | Le Lann | H04L 65/80 |
| 2002/0052754 A1 | 5/2002 | Joyce et al. | |
| 2002/0083002 A1 | 6/2002 | Menez et al. | |
| 2002/0111863 A1 | 8/2002 | Landesmann | |
| 2003/0115105 A1 | 1/2003 | Lin et al. | |
| 2003/0079124 A1 | 4/2003 | Serebrennikov | |
| 2003/0151621 A1 | 8/2003 | McEvilly et al. | |
| 2003/0163684 A1 | 8/2003 | Fransdonk | |
| 2003/0177498 A1 | 9/2003 | Ellis et al. | |
| 2004/0030797 A1* | 2/2004 | Akinlar | H04L 47/10 |
| | | | 709/232 |
| 2004/0088257 A1 | 5/2004 | Wong et al. | |
| 2005/0114367 A1 | 5/2005 | Serebrennikov | |
| 2005/0125822 A1 | 6/2005 | Casement et al. | |
| 2005/0204389 A1 | 9/2005 | Proehl et al. | |
| 2006/0085824 A1 | 4/2006 | Bruck et al. | |
| 2006/0151598 A1 | 7/2006 | Chen et al. | |
| 2006/0195888 A1 | 8/2006 | Kalonji et al. | |
| 2007/0028258 A1 | 2/2007 | Wollmershauser et al. | |
| 2007/0097860 A1 | 5/2007 | Rys et al. | |
| 2007/0101351 A1 | 5/2007 | Bagsby et al. | |
| 2008/0049767 A1 | 2/2008 | Koltenuk | |
| 2008/0109362 A1 | 5/2008 | Fransdonk | |
| 2008/0114653 A1 | 5/2008 | Hamon et al. | |
| 2008/0120668 A1 | 5/2008 | Yau | |
| 2008/0167992 A1 | 7/2008 | Kokernak et al. | |
| 2008/0168487 A1 | 7/2008 | Chow et al. | |
| 2008/0201748 A1* | 8/2008 | Hasek | H04N 7/17309 |
| | | | 725/98 |
| 2008/0235101 A1 | 9/2008 | Piepenbrink et al. | |
| 2008/0235104 A1 | 9/2008 | Chow | |
| 2008/0235278 A1 | 9/2008 | Piepenbrink et al. | |
| 2008/0275974 A1 | 11/2008 | Rackiewicz | |
| 2009/0119696 A1 | 5/2009 | Chow et al. | |
| 2009/0119703 A1 | 5/2009 | Piepenbrink et al. | |
| 2009/0132383 A1 | 5/2009 | Piepenbrink et al. | |
| 2009/0138964 A1 | 5/2009 | Headings et al. | |
| 2009/0164316 A1 | 6/2009 | Piepenbrink et al. | |
| 2009/0222335 A1 | 9/2009 | Gopal et al. | |
| 2009/0327508 A1* | 12/2009 | McCarthy | G01C 21/3647 |
| | | | 709/231 |
| 2010/0115627 A1 | 5/2010 | Chow et al. | |
| 2010/0122280 A1 | 5/2010 | Sofos et al. | |
| 2010/0124399 A1 | 5/2010 | Sofos et al. | |
| 2010/0125866 A1 | 5/2010 | Sofos et al. | |
| 2010/0125867 A1 | 5/2010 | Sofos et al. | |
| 2010/0138855 A1 | 6/2010 | Sofos et al. | |
| 2010/0146607 A1 | 6/2010 | Piepenbrink et al. | |
| 2010/0150521 A1 | 6/2010 | Chow et al. | |
| 2010/0162319 A1 | 6/2010 | Piepenbrink et al. | |
| 2010/0162342 A1 | 6/2010 | Piepenbrink et al. | |
| 2010/0162363 A1 | 6/2010 | Piepenbrink et al. | |
| 2010/0251280 A1 | 9/2010 | Sofos et al. | |
| 2010/0269160 A1 | 10/2010 | Kalonji | |
| 2010/0333032 A1 | 12/2010 | Lau et al. | |
| 2010/0333137 A1 | 12/2010 | Hamano et al. | |
| 2010/0333151 A1 | 12/2010 | Huang | |
| 2011/0022689 A1 | 1/2011 | Piepenbrink et al. | |
| 2011/0041147 A1 | 2/2011 | Piepenbrink et al. | |
| 2011/0041148 A1 | 2/2011 | Piepenbrink et al. | |
| 2011/0041149 A1 | 2/2011 | Piepenbrink et al. | |
| 2011/0055866 A1 | 3/2011 | Piepenbrink et al. | |
| 2011/0066652 A1 | 3/2011 | Piepenbrink et al. | |
| 2011/0066674 A1 | 3/2011 | Piepenbrink et al. | |
| 2011/0067049 A1 | 3/2011 | Piepenbrink et al. | |
| 2011/0112930 A1 | 5/2011 | Piepenbrink et al. | |
| 2011/0119696 A1 | 5/2011 | Piepenbrink et al. | |
| 2011/0119721 A1 | 5/2011 | Piepenbrink et al. | |
| 2011/0119738 A1 | 5/2011 | Piepenbrink et al. | |
| 2011/0153856 A1 | 6/2011 | Piepenbrink et al. | |
| 2011/0154382 A1 | 6/2011 | Chow et al. | |
| 2011/0154401 A1 | 6/2011 | Chow et al. | |
| 2011/0154404 A1 | 6/2011 | Piepenbrink et al. | |
| 2011/0222400 A1* | 9/2011 | Skoog | H04L 47/10 |
| | | | 370/230 |
| 2012/0331497 A1* | 12/2012 | Randolph | H04H 60/372 |
| | | | 725/14 |

\* cited by examiner

PUBLIC/PRIVATE COMMUNICATIONS PATHS

CROSS-REFERENCE TO RELATED APPLICATION

This application is a continuation of U.S. application Ser. No. 12/618,207 filed Nov. 13, 2009 and since issued as U.S. Pat. No. 9,325,502, and incorporated herein by reference in its entirety.

BACKGROUND

Field of the Disclosure

The present disclosure relates to providing multimedia content and, more particularly, to identity management for users of transactional multimedia content.

Description of the Related Art

Multimedia content distribution networks (MCDNs) often provide a full array of multimedia content to customers over private networks using MCDN-issued customer premises equipment (CPE). Some potential customers wishing to receive all or part of the full array of multimedia content do not have direct physical access to an MCDN's private network or do not have MCDN-issued CPE.

DESCRIPTION OF EXEMPLARY EMBODIMENTS

Figure 1:
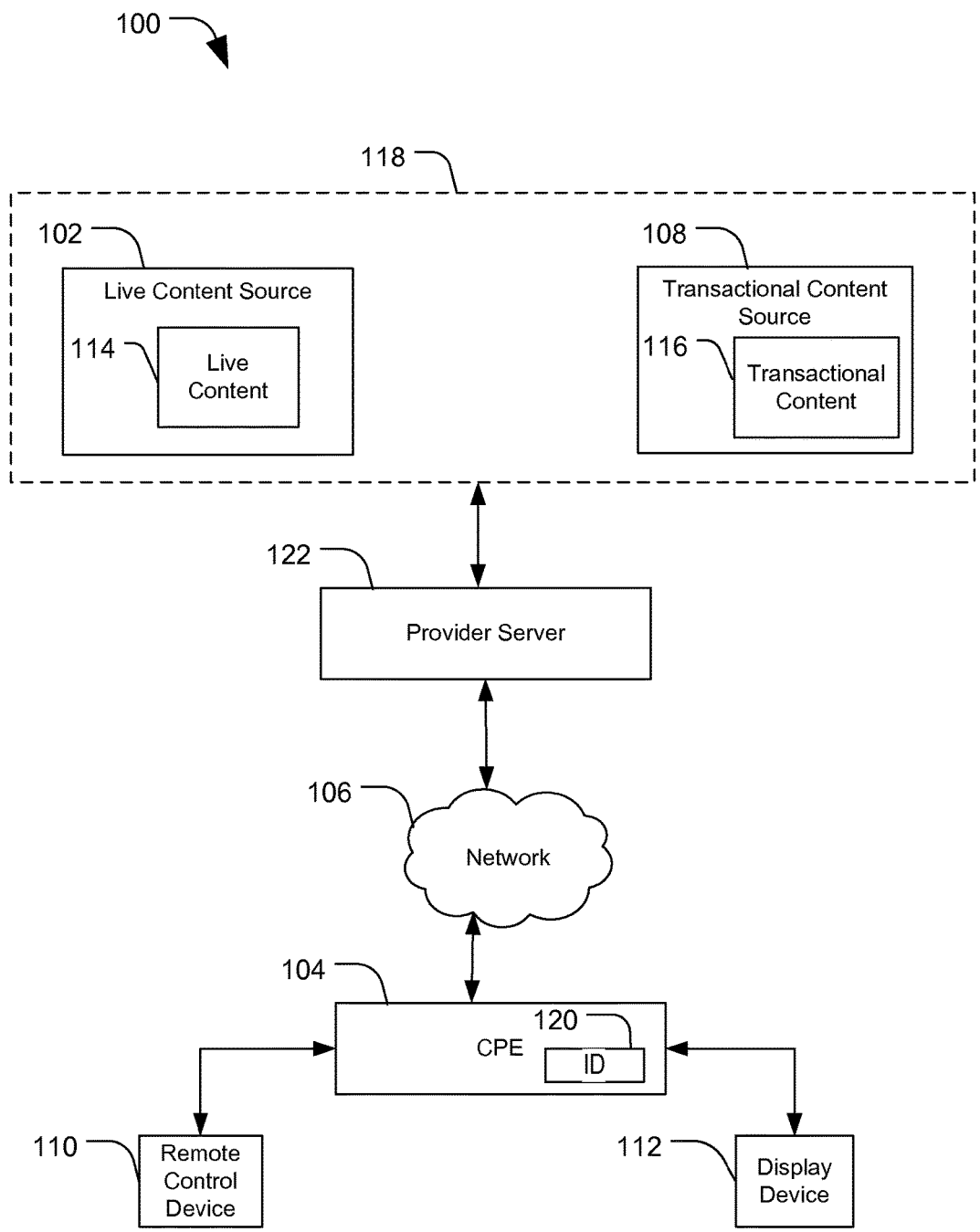
FIG. 1 is a block diagram of selected elements of an embodiment of an MCDN.

In one aspect, a device for accessing specified multimedia content (e.g., on-demand content) includes a first network interface for communicating with a multimedia content provider over an Internet protocol (IP) network. The device may be a CPE such as a set-top box (STB) or other multimedia processing resource (MPR). The device contains a computer readable medium with embedded instructions for communicating from the first network interface a certificate with a hardware authentication code over the IP network to a network server to verify that the apparatus is authorized to access the specified content. The hardware authentication code (e.g., an X509 certificate) may be uniquely indicative of the device and may be associated with the device in a substantially permanent way. Further instructions embedded in the computer readable medium are for communicating a request to access the specified content to the network server and for processing the specified content for presentation to a display device.

In certain embodiments, the device contains a second network interface for receiving the specified content over the IP network. The first and/or the second network interface may be enabled for wired communication, wireless communication, satellite communication, and combinations thereof. The specified content may be streamed to the device or otherwise downloaded for later play.

In a further aspect, a disclosed method is for providing access to transactional multimedia content (e.g., video on-demand (VOD) content) and live multimedia content. The method includes determining whether the client is associated with a first service level or a second service level. If the client is associated with the second service level, the client device is directed to a second level transactional multimedia content server. The method includes receiving a certificate indicative of a hardware authentication code from the client device, comparing the hardware authentication code to a plurality of authorized codes, and granting the client device access to the transactional multimedia content responsive to the hardware authentication code corresponding to one or more of the plurality of authorized codes. Access may be provided over a public IP network (e.g., the Internet). Determining whether the user is associated with the first service level or second service level may be determined at least in part by the quality of the communication path between the client device and a portion of an MCDN.

In some embodiments, granting access to the specified transactional content includes enabling the client device to download the specified transactional multimedia content for later viewing. Granting access may also include streaming the specified transactional multimedia content to the client device. The certificate indicative of the hardware authentication code may be received by a bootstrap server and may be received from a public IP network such as the Internet. Alternatively, the hardware authentication code may be from a private network such as a cellular network or other private IP network.

Multimedia content (e.g., a television program) is provided to users by service providers that provide access to the content over private networks, for example. Such private networks may for example, include satellite networks, fiber optic networks, coaxial networks or a combination of such networks. The service provider may issue CPE such as an STB to enable users to access specified transactional multimedia content over a private network. When a user wishes to obtain certain transactional multimedia content, the STB or other CPE issued by the service provider may authenticate with the service provider network and allow the user access to the specified or requested multimedia content.

In some cases, it is impractical to offer full-fledged service to all potential users within a service provider's footprint. For example, there may be a small percentage of potential users that live outside the bounds of what is deemed a practical service area for provisioning a service provider's private network. In such cases, the service provider may provide a limited set of content to users over public networks, such as by providing transactional multimedia content to users over the Internet. Access to the transactional multimedia content may be through hardware (e.g., an STB) issued to the user by the service provider or may be by other hardware such as a personal computer, smartphone, television, or other MHD. In some disclosed embodiments, a service provider may authenticate the user's identity by a hardware authentication code associated with the hardware and presented to the service provider as a certificate.

If an untrusted network such as the Internet is used to transport the transactional content by the service provider, disclosed systems may take steps to authenticate the identity of the user and prevent hacking by those that may wish to emulate the user or do harm to the service provider network. For example, steps may be taken to prevent IP spoofing and recognize and reject bogus session requests.

In operation, when requesting multimedia content, a client device application may connect to a bootstrap server that receives a client request and selects an appropriate server for handling the client request. For example, based on a received certificate it may be determined the client device is associated with a first level service and the client will be directed by the bootstraps server to an appropriate server for receiving a full array of multimedia content; alternatively, if the bootstrap server, based on a received certificate that includes a hardware authentication code, determines that a client device is entitled to a second service level, the client device may be directed to a server for sending transactional content over a public IP network.

In some disclosed embodiments, a certificate authority provides each CPE device that accesses multimedia content from the service provider with a unique certificate that can include a unique device identification embedded within it to use during authentication. For service provider-issued CPE such as STBs that entitle a user to a first service level, the CPE can access a first server to gain access to a full array of multimedia content including the specified transactional content (e.g., VOD movies). In other cases, such as when a client device (e.g., personal computer) running a Web browser application requests transactional content (e.g., a VOD movie) from the service provider, the service provider may direct the Web browser to a second server that provides a second service level including, for example, specified transactional content (e.g., VOD movies) only if the web browser application presents a valid certificate that includes an indication of a hardware identification code unique to the client device and associated with a user account authorized to receive the specified content.

In some embodiments, a certifying authority issues certificates for use with the client devices when attempting to access transactional content from the service provider. In some embodiments, assets within a service provider maintain a certificate to user account mapping for client device authentication and web application authentication.

Upon receiving a certificate from a client device, a determination can be made by a bootstrap server or other such device whether a user is entitled to a first service level or second service level. In some embodiments, an authentication server, responsive to receiving a certificate associated with a second level service, directs a session request to a second level server that provides access to transactional multimedia content associated with a second service level. If the authentication server receives from the client device with the request a certificate associated with a first service level, the authentication server directs the client device to a first level server. Such exemplary systems operate to provide one or more of a plurality of levels of service to users based on a permission level for each user, where the permission levels are associated with hardware associated with the user. The hardware may be issued by the service provider or may be network agnostic such as a personal computer, smart phone, or other such equipment. In the following description, details are set forth by way of example to facilitate discussion of the disclosed subject matter. It should be apparent to a person of ordinary skill in the art, however, that the disclosed embodiments are exemplary and not exhaustive of all possible embodiments.

FIG. 1 is a block diagram of a particular illustrative embodiment of system 100 used for presenting transactional multimedia content to users that may not be entitled to receive a full array of multimedia content available to other users. System 100 includes live content source 102 that communicates with CPE 104 (which may include, for example, an STB device) via network 106. Live content source 102 includes a memory to store live content 114. CPE 104 can receive input from remote control device 110 and can communicate audio and video to display device 112. In particular embodiments, network 106 may be a public network, such as the Internet, or a private access network, such as an MCDN.

As shown, CPE 104 can communicate with transactional content source 108 via network 106. Transactional content source 108 includes transactional content 116, which may be specified for download or streaming by a user of CPE 104. Server system 118 provides both live content 114 and transactional content 116 to CPE 104, depending on what service level CPE 104 is entitled to receive.

In illustrative embodiments, provider server 122 receives a request for specified transactional content (e.g., a VOD movie) over network 106 from CPE 104. Provider server 122 may function as a bootstrap server and determine, based on a certificate associated with a received request, which content source within server system 118 is the proper source for the specified content. If the received request indicates that CPE 104 is associated with a first service level that includes live multimedia content, provider server 122 may direct CPE 104 to live content source 102 to access live content 114. If CPE 104 is associated with a second service level that includes transactional content 116 (e.g., a VOD movie), provider server 122 in an exemplary embodiment directs CPE 104 to transactional content source 108 for access to transactional content 116.

Provider server 122 can determine which service level CPE 104 is entitled to receive based on a received certificate associated with CPE 104 that contains an indication of hardware authentication code 120. By comparing the received hardware authentication code to a plurality of authorized codes, a determination is made which of a plurality of services to provide the user.

Server system 118 can identify the multimedia content to be received at CPE 104 based on the request and based on whether the certificate received by provider server 122 includes an authorized hardware code. To enable a user to select or specify transactional content for download or streaming, server system 118 (or transactional content source 108) can generate an electronic storefront that includes selectable indicators related to assets selected from transactional content 116. In certain embodiments, transactional content 116 include assets such as digital wallpaper, movie images, actor images, ring tones, audio clips from media content, downloadable soundtracks, video on demand content, soundtrack clips, or any combination thereof. In general, each of the assets may have different associated access rights. For example, a ring tone electronic asset may allow unrestricted use of the ring tone after purchase, while a VOD movie download may allow either a limited number of viewings or unlimited access for a limited period of time, for example.

In an illustrative embodiment, server system 118 generates an electronic storefront including a graphical user interface (GUI). The GUI includes multiple selectable indicators related to available multimedia content that may be received at CPE 104.

In some embodiments, the GUI may include information describing selected transactional content 116 or describing a plurality of purchase options related to the selected assets. The information may be personalized to a user or subscriber of CPE 104. In another particular embodiment, the information describing the asset or the information describing the plurality of purchase options may be personalized to an account associated with CPE 104.

In an illustrative embodiment, CPE 104 may receive data that can be executed by a processor to generate a GUI, which may be provided to display device 112. The GUI can include multiple purchasable multimedia assets of different types and multiple related purchase options. CPE 104 may receive an input related to one or more of the multiple purchasable assets and an associated purchase option via remote control device 110. Accordingly, CPE 104 can send a request to server system 118 that is related to the input.

Figure 2:
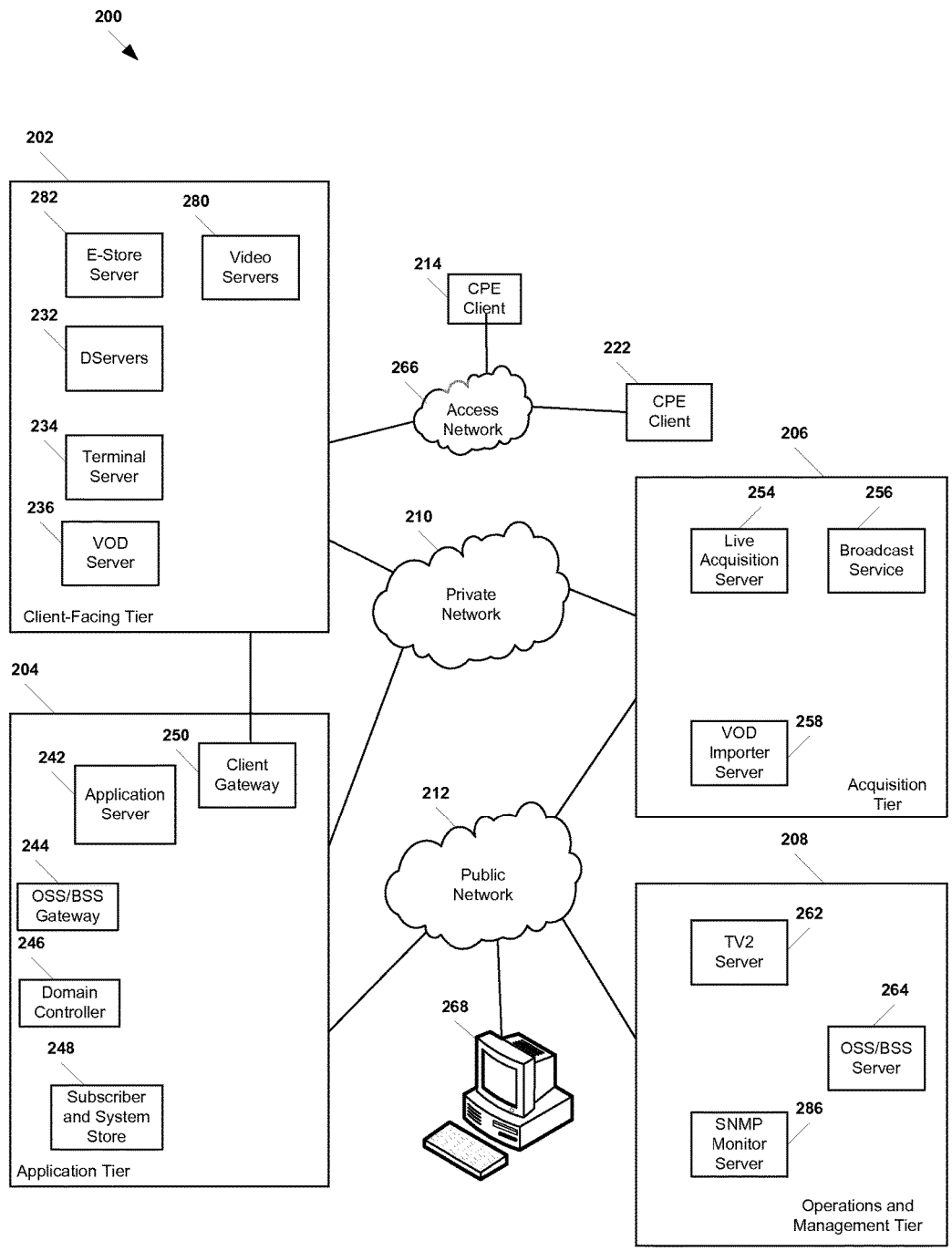
FIG. 2 is a block diagram of selected elements of an embodiment of an MCDN.

FIG. 2 is a block diagram of an illustrative embodiment of MCDN system 200 that may be used to provide multimedia content including transactional content to users according to permission levels associated with hardware identification codes for client devices that request the multimedia content. Although multimedia content is not limited to TV, VOD, or pay-per-view (PPV) programs, the depicted embodiments of MCDN system 200 and its capabilities are primarily described herein with reference to these types of multimedia content, which may be interchangeably referred to herein as "multimedia content", "multimedia content programs", "multimedia programs" or, simply, "programs."

The elements of MCDN system 200 illustrated in FIG. 2 depict network embodiments with functionality for delivering multimedia content to a set of one or more users. It is noted that different embodiments of MCDN system 200 may include additional elements or systems (not shown in FIG. 2 for clarity) as desired for additional functionality, such as data processing systems for billing, content management, customer support, operational support, or other business applications. It is further noted that elements of system 200 may be included within the analogous elements of system 100 illustrated in FIG. 1.

As shown, system 200 can include client-facing tier 202, application tier 204, acquisition tier 206, and operations and management tier 208. Each tier 202, 204, 206, 208 is coupled to private network 210; to public network 212, such as the Internet; or to both private network 210 and public network 212. For example, client-facing tier 202 can be coupled to the private network 210. Further, application tier 204 can be coupled to private network 210 and to public network 212. Acquisition tier 206 can also be coupled to private network 210 and to public network 212. Additionally, operations and management tier 208 can be coupled to public network 212.

As illustrated in FIG. 2, the various tiers 202, 204, 206, 208 communicate with each other via private network 210 and the public network 212. For instance, client-facing tier 202 can communicate with application tier 204 and acquisition tier 206 via private network 210. Application tier 204 can communicate with acquisition tier 206 via private network 210. Further, application tier 204 can communicate with acquisition tier 206 and operations and management tier 208 via public network 212. Moreover, acquisition tier 206 can communicate with operations and management tier 208 via public network 212. In a particular embodiment, elements of application tier 204, including, but not limited to, client gateway 250, can communicate directly with client-facing tier 202.

Client-facing tier 202 can communicate with user equipment via access network 266. In an illustrative embodiment, CPE clients 214, 222 can be coupled to a local switch, router, or other device of the access network 266. Client-facing tier 202 may communicate with a first representative STB device via first CPE client 214 and with a second representative STB device via second CPE client 222 (STB devices not explicitly shown in FIG. 2). In a particular embodiment, first CPE client 214 can be located at a first customer premise, and second CPE client 222 can be located at a second customer premise. In another particular embodiment, the first representative STB device and the second representative STB device can be located at a single customer premise, both coupled to one of CPE clients 214, 222. CPE clients 214, 222 can include routers, local area network (LAN) devices, modems, such as digital subscriber line (DSL) modems, any other suitable devices for facilitating communication between an STB device and access network 266, or any combination thereof.

In an exemplary embodiment, client-facing tier 202 can be coupled to CPE clients 214, 222 via fiber optic cables. In another exemplary embodiment, CPE clients 214, 222 can include DSL modems that are coupled to one or more network nodes via twisted pairs, and client-facing tier 202 can be coupled to the network nodes via fiber-optic cables. CPE clients 214, 222 may be configured to process data received via access network 266, such as multimedia content provided by elements of MCDN system 200.

CPE clients 214, 222 can include MCDN STB devices; video gaming devices or consoles that are adapted to receive MCDN content; personal computers or other computing devices that are adapted to emulate STB device functionalities; any other device adapted to receive MCDN content and transmit data to an MCDN system via an access network; or any combination thereof.

In an exemplary, non-limiting embodiment, CPE clients 214, 222 can receive data, video, or any combination thereof, from client-facing tier 202 via access network 266 and render or display the data, video, or any combination thereof, at a display device, to which it is coupled. In an illustrative embodiment, CPE clients 214, 222 can include tuners that receive and decode television programming signals or packet streams for transmission to display devices, such as TV monitors. Further, CPE clients 214, 222 may include a processor and a memory device (not shown in FIG. 2) that is accessible to the processor. In one embodiment, the memory device may store executable instructions, such as embodied by a computer program.

In an illustrative embodiment, client-facing tier 202 may include a means for communicating between client-facing tier 202 and access network 266 and between client-facing tier 202 and private network 210. In one example, the communication means in client-facing tier 202 may be a network switch or sub-system (not shown in FIG. 2) that is coupled to one or more data servers, such as D-servers 232, that store, format, encode, replicate, or otherwise manipulate or prepare video content for communication from client-facing tier 202 to CPE clients 214, 222. The communication means in client-facing tier 202 can also be coupled to terminal server 234 that provides terminal devices with a point of connection to MCDN system 200 via client-facing tier 202. In a particular embodiment, communication means in client-facing tier 202 can be coupled to VOD server 236 that stores or provides VOD content imported by MCDN system 200. Further, the communication means in client-facing tier 202 may be coupled to one or more video servers 280 that receive video content and transmit the content to CPE clients 214, 222 via access network 266. The communication means in client-facing tier 202 can also be coupled to electronic store server 282 that stores and provides data related to purchasable assets to user devices, such as CPE clients 214, 222.

In an illustrative embodiment, client-facing tier 202 can communicate with a large number of clients, such as representative CPE clients 214, 222, over a wide geographic area, such as a metropolitan area, a viewing area, a statewide area, a regional area, a nationwide area or any other suitable geographic area, market area, or subscriber or customer group that can be supported by networking client-facing tier 202 to numerous CPE clients. In a particular embodiment, the communication means in client-facing tier 202, or any portion thereof, can include a multicast router or switch that communicates with multiple CPE clients via a multicast-enabled network.

As illustrated in FIG. 2, application tier 204 can communicate with both private network 210 and public network 212. Application tier 204 can include a means for communicating that can be coupled to application server 242 and to operations systems and support/billing systems and support (OSS/BSS) gateway 244. In a particular embodiment, application server 242 can provide applications to CPE clients 214, 222 via access network 266, which enable CPE clients 214, 222 to provide functions, such as interactive program guides, video gaming, display, messaging, processing of VOD material and other MCDN multimedia content, etc. In an illustrative embodiment, application server 242 can provide location information to CPE clients 214, 222. In a particular embodiment, OSS/BSS gateway 244 includes OSS data, as well as BSS data. In one embodiment, OSS/BSS gateway 244 can provide or restrict access to OSS/BSS server 264 that stores operations and billing systems data.

The means for communicating in application tier 204 can be coupled to domain controller 246 that provides Internet access, for example, to users at their computers 268 via public network 212. For example, domain controller 246 can provide remote Internet access to IPTV account information, e-mail, personalized Internet services, or other online services via public network 212. In addition, the means for communicating in application tier 204 can be coupled to subscriber and system store 248 that includes account information, such as account information that is associated with users who access MCDN system 200 via private network 210 or public network 212. In an illustrative embodiment, subscriber and system store 248 can store subscriber or customer data and create subscriber or customer profiles that are associated with IP addresses, stock-keeping unit (SKU) numbers, hardware identification codes, other identifiers, or any combination thereof, of corresponding CPE clients 214, 222. In another illustrative embodiment, the subscriber and system store can store data associated with capabilities of STB devices associated with particular customers.

In a particular embodiment, application tier 204 can include client gateway 250 that communicates data directly to client-facing tier 202. In this embodiment, client gateway 250 can be coupled directly to client-facing tier 202. Client gateway 250 can provide user access to private network 210 and other tiers coupled thereto. In an illustrative embodiment, CPE clients 214, 222 can access MCDN system 200 via access network 266, using information received from client gateway 250. User devices can access client gateway 250 via access network 266, and client gateway 250 can allow such devices to access private network 210 once the devices are authenticated or verified. Similarly, client gateway 250 can prevent unauthorized devices, such as hacker computers or stolen CPE from accessing private network 210, by denying access to these devices beyond access network 266.

For example, when a first representative CPE client 214 accesses client-facing tier 202 via access network 266, client gateway 250 can verify subscriber information by communicating with subscriber and system store 248 via private network 210. Further, client gateway 250 can verify billing information and status by communicating with OSS/BSS gateway 244 via private network 210. In one embodiment, OSS/BSS gateway 244 can transmit a query via public network 212 to OSS/BSS server 264. After client gateway 250 confirms subscriber and/or billing information, client gateway 250 can allow CPE client 214 to access MCDN content and VOD content at client-facing tier 202. If client gateway 250 cannot verify subscriber information for CPE client 214, e.g., because it is connected to an unauthorized twisted pair or has an unauthorized hardware identification code, client gateway 250 can block transmissions to and from CPE client 214 beyond access network 266.

In FIG. 2, acquisition tier 206 may include a means for communication (not shown in FIG. 2) with private network 210, that can also communicate with operations and management tier 208 via public network 212. In a particular embodiment, the communication means in acquisition tier 206 can be coupled to live acquisition server 254 that receives or acquires television content, movie content, advertisement content, other video content, or any combination thereof, from broadcast service 256, such as a satellite acquisition system or satellite head-end office. In a particular embodiment, live acquisition server 254 can transmit content to the communication means in acquisition tier 206, which can transmit the content to client-facing tier 202 via private network 210.

In an illustrative embodiment, multimedia content can be transmitted to D-servers 232, where it can be encoded, formatted, stored, replicated, or otherwise manipulated and prepared for communication from video server(s) 280 to CPE clients 214, 222. Client-facing tier 202 can receive content from video server(s) 280 and communicate the content to CPE 214, 222 via access network 266. STB devices can receive the content via CPE 214, 222, and can transmit multimedia content to television monitors (not shown in FIG. 2). In an illustrative embodiment, video or audio portions of the multimedia content can be streamed to CPE clients 214, 222.

Further, acquisition tier 206 can be coupled to a VOD importer server 258 that receives and stores television or movie content received at acquisition tier 206 and communicates the stored content to VOD server 236 at client-facing tier 202 via private network 210. Additionally, at acquisition tier 206, VOD importer server 258 can receive content from one or more VOD sources outside MCDN system 200, such as movie studios and programmers of non-live content. VOD importer server 258 can transmit the VOD content to acquisition tier 206, which can communicate the material to client-facing tier 202 via private network 210. The VOD content can be stored at one or more servers, such as VOD server 236.

When users issue requests for VOD content via CPE clients 214, 222, the requests can be transmitted over access network 266 to VOD server 236, via client-facing tier 202. Upon receiving such requests, VOD server 236 can retrieve the requested VOD content and transmit the content to CPE clients 214, 222 across access network 266. In an illustrative embodiment, video or audio portions of VOD content can be streamed to CPE clients 214, 222.

In FIG. 2, operations and management tier 208 can include a means for communication (not shown in FIG. 2) that conducts communication between operations and management tier 208 and public network 212. The communication means in operations and management tier 208 may be coupled to TV2 server 262. Additionally, communication means in operations and management tier 208 can be coupled to OSS/BSS server 264 and to simple network management protocol (SNMP) monitor server 286 that monitors network devices within or coupled to MCDN system 200. In a particular embodiment, the communication means in operations and management tier 208 can communicate with acquisition tier 206 via public network 212.

In an illustrative embodiment, live acquisition server 254 can transmit content to acquisition tier 206, which can transmit the content to operations and management tier 208 via public network 212. In this embodiment, the operations and management tier 208 can transmit the content to TV2 server 262 for display to users accessing the user interface at TV2 server 262. For example, a user can access TV2 server 262 using personal computer 268 coupled to public network 212.

In a particular illustrative embodiment, CPE client 214 may receive an input from the remote control device and transmit a request to client-facing tier 202 for an electronic storefront. The request may include an identifier related to the selected media content, an identifier related to CPE client 214, an account identifier associated with CPE client 214, an identifier associated with the electronic storefront, or any combination thereof. In a particular embodiment, in response to sending the request and after authentication, CPE client 214 may receive a GUI that includes an electronic storefront that has multiple purchasable assets and multiple selectable payment options. In one embodiment, CPE client 214 can receive data that can be executed by a processor to generate a GUI that includes an electronic storefront that has multiple purchasable assets and multiple selectable payment options. A user may utilize a remote control device to purchase one or more assets and to select a payment option related to the purchase. CPE client 214 may send an asset identifier (e.g., hardware identification code) and purchase information to E-store server 282 for fulfillment.

Figure 3:
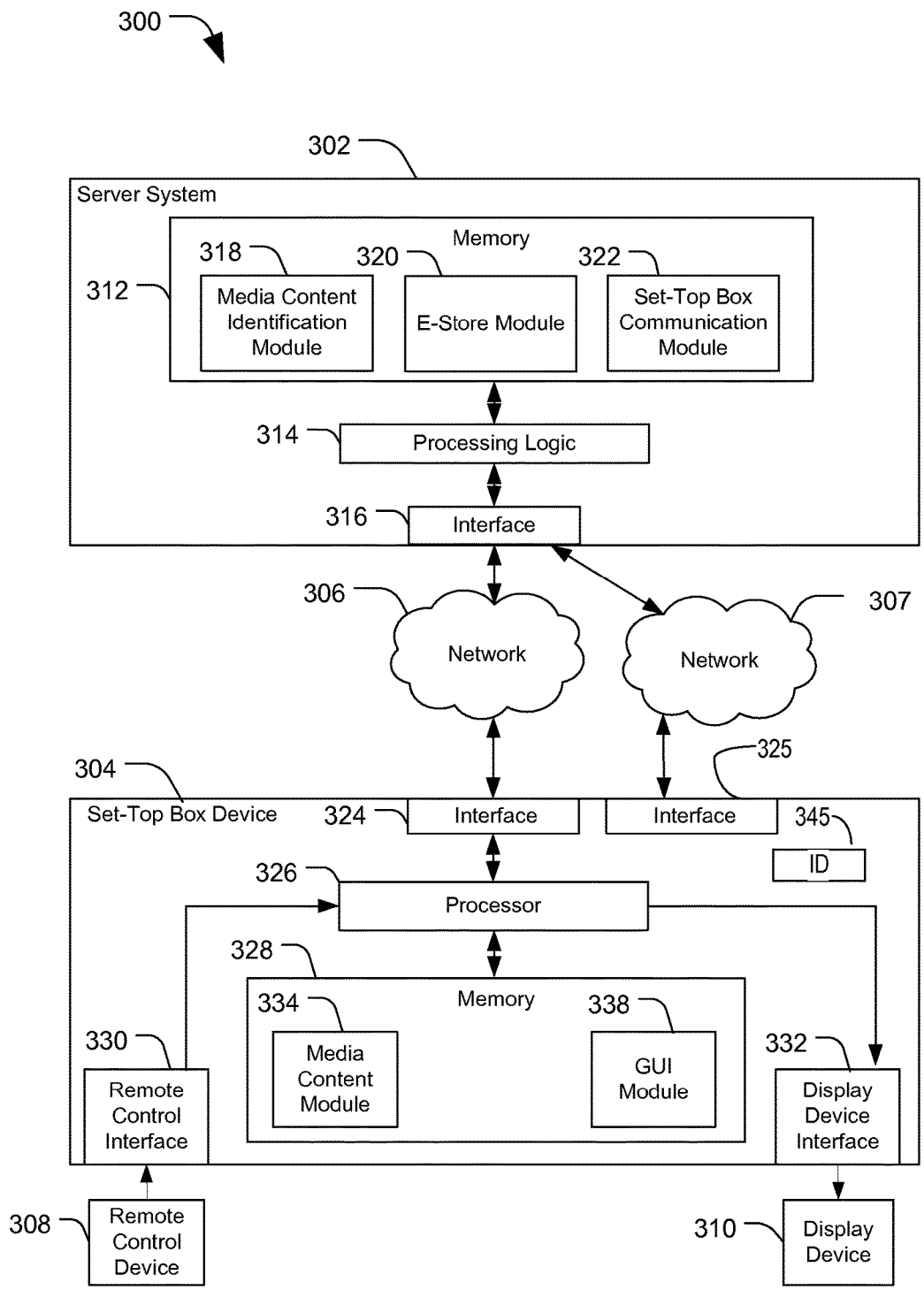
FIG. 3 is a block diagram of selected elements of an embodiment of an MCDN.

FIG. 3 is a block diagram of an illustrative embodiment of system 300 for distributing multimedia content including transactional content (e.g., VOD movies) to users in accordance with disclosed embodiments. As shown, system 300 includes server system 302 that communicates with STB device 304 via network 306, which may include portions of the public Internet or portions of an MCDN. In addition, server system 302 communicates with STB device 304 via network 307, which may include a cellular network, private network, or other network for communication between server system 302 and STB 304. Server system 302 includes interface 316, processing logic 314 and memory 312 that is accessible to processing logic 314. As shown, interface 316 communicates with both networks 306 and 307. Communications between server system 302 and networks 306 and 307 may be through disparate protocols and media. For example, the communications between server system 306 and networks 306 and 307 may be any combination of technologies including IP, cellular, wired, wireless, optical, radio, coaxial, and the like.

In a particular embodiment, memory 312 includes media content identification module 318 that can be executed by processing logic 314 to transmit requested multimedia content to STB device 304. Memory 312 may also include electronic store (e-store) module 320 that can be executed by processing logic 314 to generate an electronic storefront, including a GUI for a user to specify transactional assets to download or stream. Memory 312 may also include STB communication module 322 that can be executed by processing logic 314 to communicate with STB device 304 to receive requests for an electronic storefront related to media content and to communicate the generated electronic storefront to STB device 304. In a particular illustrative embodiment, STB communication module 322 receives a certificate from STB device 304 that allows STB communication module 322 to authenticate STB device 304. In some embodiments, the certificate is received over network 307 and multimedia content is delivered to STB device 304 over network 306.

In some illustrative embodiments, STB communication module 322 receives a certificate from STB device 304 that includes an indication of hardware identification code 345. STB communication module 322 may determine from the certificate whether STB device 304 is entitled to service. If multiple levels of service are available, STB communication module 322 may determine what service level STB device 304 is entitled to receive. For example, if STB device 304 is only entitled to receive a second service level that includes only transactional content (e.g., only VOD movies), then STB communication module 322 may instruct E-store module 320 to provide STB device 304 with a GUI including available transactional content associated with the second service level. Otherwise, if STB device 304 is authorized to receive a first service level that includes live content, STB communication module 322 may instruct E-store module 320 to provide STB device 304 with a GUI including available live content associated with the first service level. Accordingly, server system 302 provides access to transactional content and live content according to the service level associated with STB device 304. Determining which service level is associated with STB device 304 may include comparing a certificate received over network 307 or network 306 to a list of authorized certificates.

In some embodiments, the service level available to STB device 304 is predetermined according to, for example, whether a service provider has installed network resources sufficient to provide a full level service at the location of STB device 304. In other exemplary embodiments, server system 302 or STB device 304 may determine which service level to provide to STB device 304 based on the quality of the communication path between STB device 304 and server system 302. For example, network 306 may support a first service level and network 307 may support a second service level. If network 306 becomes unavailable, STB communication module 322 may detect this unavailability and, accordingly, provide STB device 304 with a second service level through network 307.

As shown, STB device 304 includes interface 324 to network 306 and interface 325 to network 307. STB device 304 may also include processor 326 coupled to interface 324 and memory 328 that is accessible to processor 326. STB device 304 may also include remote control interface 330 that communicates with remote control device 308 and display device interface 332 that communicates with display device 310. In a particular embodiment, memory 328 includes media content module 334 that is executable by processor 326 to receive media content from server system 302 (or from another content source) via network 306. Memory 328 may also include GUI module 338 that is executable by processor 326 to receive instructions related to an electronic storefront and to generate a GUI that can be provided to display device 310 that includes one or more selectable indicators related to purchasable assets that may include transactional content associated with a first or second service level.

In a particular illustrative embodiment, e-store module 320 may be executed to select an electronic storefront from a plurality of stored electronic storefronts based on multimedia content available to STB device 304. In another particular illustrative embodiment, e-store module 320 can be executed to generate the electronic storefront dynamically, such that the GUI includes an electronic storefront having a first selectable element related to a first specified multimedia asset and a second selectable element related to a second specified multimedia asset (both selected based on a received certificate that includes an indication of a hardware identification code associated with a requesting device). The GUI can also include multiple payment options that are related to a first selectable element and a second selectable element. In a particular illustrative embodiment, the multiple payment options can include an electronic coupon payment option, account billing option to bill a subscriber account associated with the destination device (i.e., the STB device), a credit card option, a debit card option, other payment options, or any combination thereof.

If a user selects transactional content for viewing, STB device 304 sends a request to server system 302 requesting specified transactional multimedia content (e.g., a VOD movie). The request may include an identifier related to the media content, a hardware identifier associated with STB device 304, a subscriber account identifier, an electronic storefront identifier, other information, or any combination thereof. In accordance with some disclosed embodiments, the request may include or be preceded by a certificate that includes an indication of hardware identification code 345.

In some embodiments, STB device 304 receives data related to an electronic storefront based on the request, and provides a user interface to display device 310 that includes the electronic storefront. The electronic storefront includes one or more selectable indicators related to available transactional multimedia assets. The electronic storefront also includes one or more payment options for purchasing selected assets if a charge is associated with the asset. STB device 304 receives a selection of at least one indicator and a selected payment option and sends data related to the selection and the selected payment option to server system 302 to complete a purchase transaction.

Figure 4:
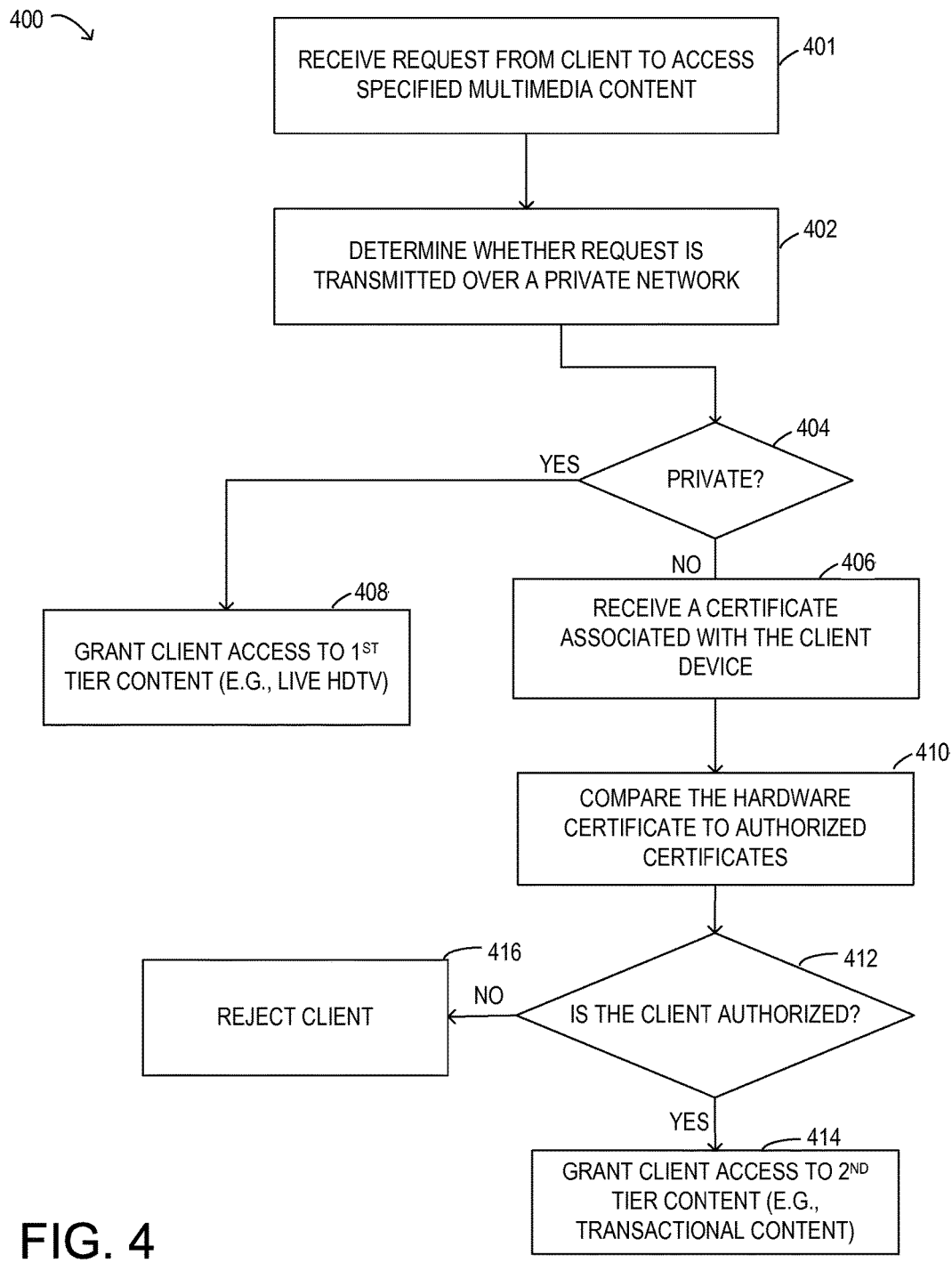
FIG. 4 is an embodiment of a method for providing a user with transactional content in response to determining that the user is an authorized user.

FIG. 4 illustrates elements of an embodied method 400 for identity management for distributing transactional content. As shown, a request is received (block 401) from a client device to access multimedia content. For example, a client device may request transactional content (e.g., a VOD movie). A determination may be made (block 402) whether the request was transmitted over a private network or public IP network. If the request was received over a private network, the client device may be granted access to first level content such as live high-definition television. Granting the client access may also be conditional upon authenticating a certificate received from the client device. In such embodiments, if the certificate received from the client device is associated with an account authorized to receive first level content, then the client is granted access (block 408).

If the request is not received over a private network (block 404), a certificate associated with the client device is received (block 406) and compared (block 410) to authorized certificates. The certificate includes an indication of a hardware identifier for the client device from which the request was made. If the client device is an authorized device (block 412), a client is granted access (block 414) to second level content such as transactional content (e.g., a VOD movie). If the client is not an authorized client (block 412), then the client is rejected (block 416).

Figure 5:
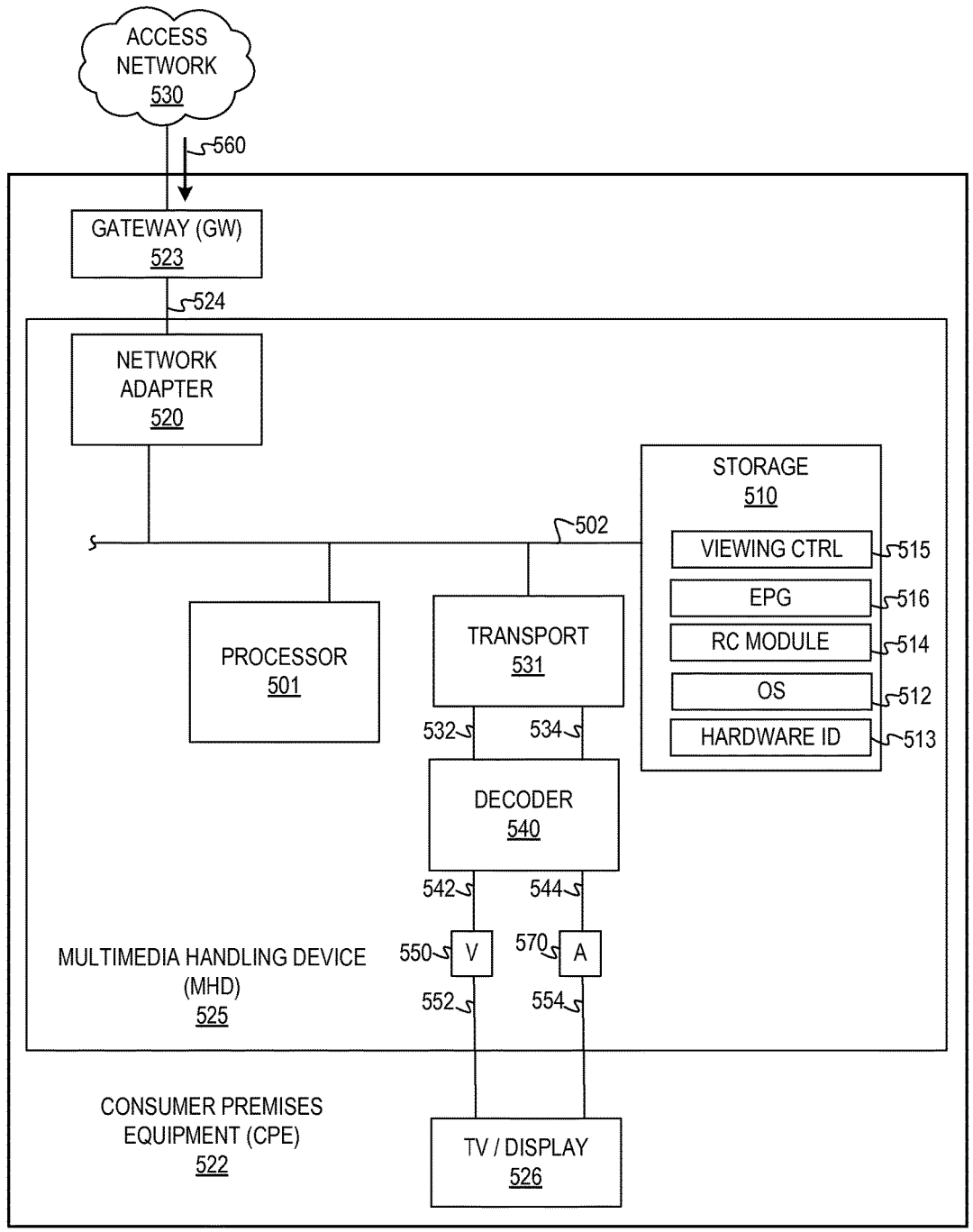
FIG. 5 illustrates a multimedia handling device (MHD) for requesting and receiving transactional content in accordance with disclosed embodiments.

FIG. 5 illustrates a block diagram with selected elements of MHD 525. As shown, MHD 525 can be a functional component of CPE 522 along with gateway (GW) 523 and display 526, independent of any physical implementation. In particular, it is noted that CPE 522 may be any combination of GW 523, MHD 525 and display 526. It is further noted that elements of MHD 525 may be included within the analogous elements of system 100 and system 200 illustrated in FIGS. 1 and 2, respectively.

In the embodiment depicted in FIG. 5, MHD 525 includes processor 501 coupled via shared bus 502 to storage media collectively identified as storage 510. MHD 525 further includes network adapter 520 that interfaces MHD 525 to LAN 524 and through which MHD 525 receives multimedia content 560. GW 523 is shown providing a bridge between access network 530 and LAN 524, and receiving multimedia content 560 from access network 530.

In embodiments suitable for use in IP based content delivery networks, MHD 525, as depicted in FIG. 5, may include transport unit 531 that assembles the payloads from a sequence or set of network packets into a stream of multimedia content. In coaxial based access networks, content may be delivered as a stream that is not packet based and it may not be necessary in these embodiments to include transport unit 530. In a co-axial implementation, however, clients, such as CPE 522, may require tuning resources (not explicitly depicted in FIG. 5) to "filter" desired content from other content that is delivered over the coaxial medium simultaneously and these tuners may be provided in MHDs 525. The stream of multimedia content received by transport unit 530 may include audio information and video information and transport unit 530 may parse or segregate the two to generate video stream 532 and audio stream 534 as shown.

Video and audio streams 532 and 534, as output from transport unit 530, may include audio or video information that is compressed, encrypted, or both. A decoder unit 540 is shown as receiving video and audio streams 532 and 534 and generating native format video and audio streams 542 and 544. Decoder 540 may employ any of various widely distributed video decoding algorithms including any of the Motion Pictures Expert Group (MPEG) standards or Windows Media Video (WMV) standards, as examples. Similarly decoder 540 may employ any of various audio decoding algorithms including Dolby® Digital, Digital Theatre System (DTS) Coherent Acoustics, and Windows Media Audio (WMA).

The native format video and audio streams 542 and 544 as shown in FIG. 5 may be processed by encoders/digital-to-analog converters (encoders/DACs) 550 and 570 respectively to produce analog video and audio signals 552 and 554 in a format compliant with display 526, which itself may not be a part of MHD 525. Display 526 may comply with National Television System Committee (NTSC), Phase Alternating Line (PAL) or any other suitable television standard.

Storage 510 is operable to store instructions, data, or both. Storage 510 may include any combination, for example, of persistent media, volatile media, fixed media, removable media, magnetic media, and semiconductor media. Storage 510 as shown may include sets or sequences of instructions, namely, an operating system 512, a remote control (RC) application program identified as RC module 514, an electronic programming guide (EPG) 516, and viewing control 515. Operating system 512 may be a UNIX or UNIX-like operating system, a Windows® family operating system, or another suitable operating system.

EPG 516 represents a guide to the multimedia content provided to CPE 522 via MCDN system 200 (see FIG. 2), and may be shown to the user as an element of the user interface. The user interface may include a plurality of menu items arranged according to one or more menu layouts, which enable a user to operate MHD 525. The user may operate the user interface, including EPG 516, using a remote control such as 308 (FIG. 3) in conjunction with RC module 514.

As shown, hardware ID 513 is a hardware identification code unique to MHD 525. Accordingly, hardware ID 513 or an indication of hardware ID 513 may be included in certificate sent to access network 530 to authenticate hardware ID 513 and establish whether MHD 525 is entitled to receive a first or second service level, for example. In some embodiments, a bootstrap server (not depicted) communicatively coupled to or within access network 530 compares hardware ID 513 to a list of certificates for authorized client devices. In some embodiments, if hardware ID 513 is associated with a second service level, MHD 525 is directed by the bootstrap server or other network device to a transactional multimedia content server. MHD 525 may then issue a request for certain transactional content (e.g., a VOD movie). If hardware ID 513 is associated with a permission level that may receive the specified transaction content, MHD 525 is granted access to the specified transactional content. In some embodiments, access is granted to receive the specified content over an IP network (e.g., the Internet). If, when comparing hardware ID 513 to authorized hardware codes, it is determined that hardware ID 513 is associated with a first service level, the bootstrap server or other network device may direct MHD 525 to a live multimedia content server, for example, to receive first level service that may include live content or other content that is unavailable with the second service level. In some embodiments, MHD 525 may receive first service level content over a private network including an MCDN. However, if the MCDN is unavailable to MHD 525, then MHD 525 may receive second service level content (e.g., transactional content such as VOD movies) over a public IP network. In this way, MHD 525 may receive an alternate level of service when one or more portions of the MCDN are unavailable.

If MHD 525 receives transactional content, the content may be streamed and simultaneously displayed on display 526 or may be downloaded to storage 510 for later play. In some embodiments of MHD 525, hardware ID 513 may be substantially irreplaceably embedded within a portion of storage 510. For example without limitation, hardware ID 513 may be embedded in read-only memory that is permanently affixed to MHD 525 in a way that prevents hackers from accessing hardware ID 513 and using the hardware ID in an unauthorized machine.

In some embodiments, an indication of hardware ID 513 may be included in an X.509 certificate issued by a certification authority and used by MHD 525 to verify its identity and authorization level when requesting multimedia content. To obtain an X.509 certificate, MHD 525 may request the certificate from the certification authority and include an indication of hardware ID 513 in the request. An indication of hardware ID 513 may then be included in the certificate issued by the certification authority as the serial number or unique identifier for the X.509 certificate, as examples.

To the maximum extent allowed by law, the scope of the present disclosure is to be determined by the broadest permissible interpretation of the following claims and their equivalents, and shall not be restricted or limited to the specific embodiments described in the foregoing detailed description.

The invention claimed is:

1. A system, comprising:
a hardware processor; and
a memory device, the memory device storing instructions, the instructions when executed causing the hardware processor to perform operations, the operations comprising:
receiving a request for content from a client device;
determining a routing decision based on the request for content;
determining a first communications path from a content server via a public network to the client device in response to the request for content specifying a video on demand;
determining a second communications path from a different content server via a private cellular network to the client device in response to the request for content specifying live video content;
in response to the request for content specifying the video on demand, sending the request for content to the content server providing the video on demand via the public network; and
in response to the request for content specifying the live video content, sending the request for content to the different content server providing the live video content via the private cellular network.

2. The system of claim 1, wherein the operations further comprise retrieving a network address that corresponds to the first communications path.

3. The system of claim 1, wherein the operations further comprise retrieving a network address that corresponds to the content server.

4. The system of claim 1, wherein the operations further comprise retrieving a network address that corresponds to the second communications path.

5. The system of claim 1, wherein the operations further comprise retrieving a network address that corresponds to the different content server.

6. The system of claim 1, wherein the operations further comprise retrieving the video on demand.

7. The system of claim 1, wherein the operations further comprise retrieving the live video content.

8. A method, comprising:
receiving, by a server, a request for content from a client device;
determining, by the server, a routing decision based on the request for content from the client device;
determining, by the server, a first communications path from a content server via a public network to the client device in response to the request for content specifying a video on demand;
determining, by the server, a second communications path from a different server via a private cellular network in response to the request for content specifying live video content;
in response to the request for content specifying the video on demand, sending, by the server, the request for content to the content server providing the video on demand via the public network; and
in response to the request for content specifying the live video content, sending, by the server, the request for content to the different content server providing the live video content via the private cellular network.

9. The method of claim 8, further comprising retrieving a network address that corresponds to the first communications path.

10. The method of claim 8, further comprising retrieving a network address that corresponds to the content server.

11. The method of claim 8, further comprising retrieving a network address that corresponds to the second communications path.

12. The method of claim 8, further comprising retrieving a network address that corresponds to the different content server.

13. The method of claim 8, further comprising retrieving the video on demand.

14. The method of claim 8, further comprising retrieving the live video content.

15. A memory device storing processor-executable instructions that when executed cause a processor to perform operations, the operations comprising:
  receiving a request for content from a client device;
  determining a routing decision based on the request for content;
  determining a first communications path from a content server via a public network to the client device in response to the request for content specifying a video on demand;
  determining a second communications path from a live content server via a private cellular network to the client device in response to the request for content specifying live video content;
  in response to the request for content specifying the video on demand, sending the request for content to the content server providing the video on demand via the public network; and
  in response to the request for content specifying the live video content, sending the request for content to the live content server providing the live video content via the private cellular network.

16. The memory device of claim 15, wherein the operations further comprise retrieving a network address that corresponds to the first communications path.

17. The memory device of claim 15, wherein the operations further comprise retrieving a network address that corresponds to the content server.

18. The memory device of claim 15, wherein the operations further comprise retrieving a network address that corresponds to the second communications path.

19. The memory device of claim 15, wherein the operations further comprise retrieving a network address that corresponds to the different content server.

20. The memory device of claim 15, wherein the operations further comprise retrieving the video on demand.

* * * * *